United States Patent
Sobanski

(10) Patent No.: US 11,808,209 B1
(45) Date of Patent: Nov. 7, 2023

(54) AFTERCOOLER EXHAUST DUCT PROTECTION

(71) Applicant: Raytheon Technologies Corporation, Farmington, CT (US)

(72) Inventor: Jon Erik Sobanski, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/306,420

(22) Filed: Apr. 25, 2023

(51) Int. Cl.
  *F02C 7/141* (2006.01)
  *F02C 3/30* (2006.01)
  *F01K 23/10* (2006.01)

(52) U.S. Cl.
  CPC .............. *F02C 7/141* (2013.01); *F01K 23/10* (2013.01); *F02C 3/30* (2013.01)

(58) Field of Classification Search
  CPC ............. F02C 7/141; F02C 3/30; F01K 23/10
  See application file for complete search history.

(56) References Cited

U.S. PATENT DOCUMENTS

| 3,799,249 A | 3/1974 | Linhardt |
| 11,530,635 B2 | 12/2022 | Kupratis et al. |
| 2011/0162368 A1* | 7/2011 | Schroder ................. F01K 13/02 60/670 |
| 2021/0207500 A1 | 7/2021 | Klingels et al. |

* cited by examiner

*Primary Examiner* — Brandon D Lee
(74) *Attorney, Agent, or Firm* — Carlson, Gaskey & Olds, P.C.

(57) ABSTRACT

A turbine engine assembly includes a condenser that is at least partially disposed within the core flow path where water is extracted from the exhaust gas flow, an evaporator system that is at least partially disposed within the core flow path that is upstream of the condenser where thermal energy from the exhaust gas flow is utilized to generate a steam flow. An aftercooler provides a cooling flow that is selectively injected into the core flow path upstream of at least the condenser for cooling the exhaust gas flow in response to a parameter that is indicative of an engine operating parameter that exceeds a predefined condition.

20 Claims, 3 Drawing Sheets

AFTERCOOLER EXHAUST DUCT PROTECTION

STATEMENT REGARDING FEDERALLY SPONSORED RESEARCH OR DEVELOPMENT

This invention was made with Government support under Contract DE-AR0001561 awarded by the United States Department of Energy, Office of ARPA-E. The Government has certain rights in this invention.

TECHNICAL FIELD

The present disclosure relates generally to an aircraft propulsion system that includes a steam generation system transforming recovered water into a steam flow injected into a core flow.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate an exhaust gas flow. Steam injection can provide improved propulsive efficiencies. Water recovered from the exhaust gas flow may be transformed into steam using thermal energy from the exhaust gas flow. Water recovery and steam generation utilize heat exchangers exposed to the high temperatures of the exhaust gas. Some engine operating conditions can result in higher exhaust gas flow temperatures that approach material and operation limits of the heat exchangers.

SUMMARY

A turbine engine assembly according to an exemplary embodiment of this disclosure includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, a condenser that is at least partially disposed within the core flow path where water is extracted from the exhaust gas flow, an evaporator system that is at least partially disposed within the core flow path that is upstream of the condenser where thermal energy from the exhaust gas flow is utilized to generate a steam flow from at least a portion of water that is extracted by the condenser for injection into a core flow path, and an aftercooler where a cooling flow is selectively injected into the core flow path that is downstream of the turbine section and upstream of at least the condenser for cooling the exhaust gas flow in response to a parameter that is indicative of an engine operating parameter that exceeds a predefined condition.

In a further embodiment of the foregoing turbine engine assembly, the aftercooler is configured to inject the cooling flow into the core flow path that is downstream of the turbine section and upstream of the evaporator.

In a further embodiment of any of the foregoing, the turbine engine assembly includes a controller that is configured to operate the aftercooler. The controller is further configured to receive information that is indicative of the engine operating parameter and to actuate the aftercooler to inject the cooling flow into the core flow path that is responsive to a determination that the predefined condition has been exceeded.

In a further embodiment of any of the foregoing turbine engine assemblies, the cooling flow includes a flow of liquid water.

In a further embodiment of any of the foregoing, the turbine engine assembly further includes a water pump that pressurizes the flow of liquid water to a pressure that is equal to or greater than a pressure of the gas flow within the core flow path.

In a further embodiment of any of the foregoing turbine engine assemblies, at least a portion of the flow of liquid water is extracted by the condenser from the exhaust gas flow through the core flow path.

In a further embodiment of any of the foregoing turbine engine assemblies, the engine operating parameter includes a temperature of a duct that corresponds to one of the evaporator system or the condenser.

In a further embodiment of any of the foregoing, the turbine engine assembly includes at least one sensor for measuring a temperature that is associated with at least one of the condenser or the evaporator system and is configured to communicate a measured temperature to the controller.

In a further embodiment of any of the foregoing turbine engine assemblies, the condenser and the evaporator system are at least partially disposed within an exhaust duct and the controller is further programmed to operate the aftercooler to cool the exhaust duct.

An aircraft propulsion system according to another exemplary embodiment of this disclosure includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, an exhaust duct that defines the core flow path for the exhaust gas flow that exits the turbine section, a condenser that is at least partially disposed within the exhaust duct, the condenser is configured for extracting water from the exhaust gas flow, an evaporator system that is at least partially disposed within the exhaust duct that is upstream of the condenser, the evaporator system is configured to use thermal energy from the exhaust gas flow to vaporize water into a steam flow from at least a portion of water that is extracted by the condenser for injection into a core flow path, an aftercooler that is configured to selectively inject a cooling water flow into the core flow path that is downstream of the turbine section for cooling the exhaust gas flow, and a controller that is configured to actuate the aftercooler in response to an indication that a temperature associated with the condenser or the evaporator system has exceeded a predefined threshold.

In a further embodiment of the foregoing aircraft propulsion system, at least the compressor section, combustor section and the turbine section are arranged along a core engine axis that is offset relative to an engine longitudinal axis.

In a further embodiment of any of the foregoing aircraft propulsion systems, the aftercooler is configured to inject the cooling water flow into the exhaust duct upstream of the evaporator system.

In a further embodiment of any of the foregoing aircraft propulsion systems, at least a portion of the cooling water flow is extracted from the exhaust gas flow by the condenser.

In a further embodiment of any of the foregoing aircraft propulsion systems, the aftercooler includes a plurality of injectors for communicating the cooling water flow into the exhaust duct.

In a further embodiment of any of the foregoing aircraft propulsion systems, the aftercooler includes a first portion for injecting cooling water flow toward the evaporator system and a second portion for injecting cooling water flow toward the condenser.

In a further embodiment of any of the foregoing, the aircraft propulsion system includes at least one sensor for measuring a temperature that is associated with at least one of the condenser or the evaporator system and configured to communicate a measured temperature to the controller.

A method of operating a gas turbine engine, the method, according to another exemplary embodiment of this disclosure includes, among other possible things, generating an exhaust gas flow that is communicated through a core flow path, expanding the gas flow through a turbine section to generate a mechanical power output, routing the exhaust gas flow through an exhaust duct that defines the core flow path for the exhaust gas flow that exits the turbine section, extracting water from the gas flow in a condenser that is at least partially disposed within the exhaust duct, generating a steam flow by heating water that is extracted by the condenser with an evaporator that is at least partially disposed within the exhaust duct, monitoring a temperature within the exhaust duct at a location downstream of the turbine section, and injecting a cooling water flow into the exhaust duct in response to a measured temperature within the exhaust duct that exceeds a predefined threshold temperature to reduce a temperature of the exhaust gas flow to a temperature that is compatible with operation of the condenser or the evaporator.

In a further embodiment of the foregoing, the method further includes pressurizing water that is extracted from the exhaust gas flow and utilizes the pressurized water for injection into the exhaust duct.

In a further embodiment of any of the foregoing, the method further includes selectively injecting water at a location upstream of the evaporator.

In a further embodiment of any of the foregoing, the method further includes selectively injecting water at a location downstream of the evaporator.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
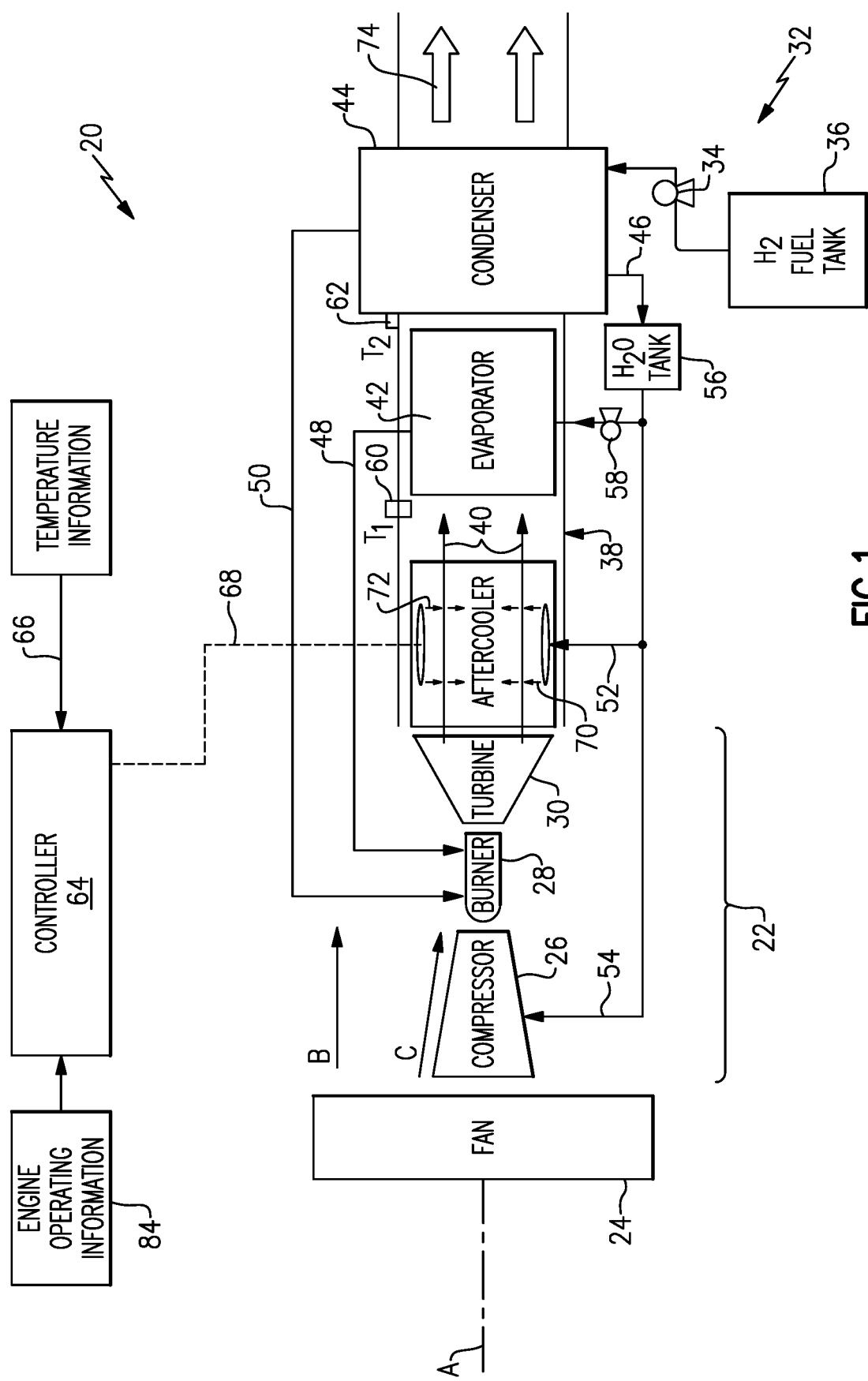
FIG. 1 is a schematic view of an example aircraft propulsion system embodiment.

FIG. 1 schematically illustrates an example propulsion system 20 that includes an aftercooler 70 for routing a cooling flow into a hot exhaust gas flow 40 to protect operation and the structure of an exhaust duct 38 and heat exchangers of a condenser 44 and an evaporator system 42. The aftercooler 70 is selectively operated to inject a cooling flow into a core flow path downstream of a turbine section 30 in response to an engine operating parameter indicating that temperatures have exceeded a predefined threshold value. The cooling flow cools the gas flow 40 to temperatures within a predetermined operating range.

The example propulsion system 20 includes a fan section 24 and a core engine 22. The core engine 22 includes a compressor section 26, a combustor section 28 and the turbine section 30 disposed along an engine longitudinal axis A. The fan section 24 drives inlet airflow along a bypass flow path B, while the compressor section 26 draws air in along a core flow path C. The inlet airflow is compressed and communicated to the combustor section 28 where the compressed core airflow is mixed with a fuel flow 50 and ignited to generate the exhaust gas flow 40. The exhaust gas flow 40 expands through the turbine section 30 where energy is extracted and utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 32 including at least a fuel tank 36 and a fuel pump 34 to provide the fuel flow 50 to the combustor 28. The example fuel system 32 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

An evaporator system 42 and condenser 44 are disposed downstream of the turbine section 30 and receive the exhaust gas flow 40. The evaporator system 42 utilizes thermal energy from the exhaust gas flow 40 to generate a steam flow 48 from a water flow 46 extracted by the condenser 44. The condenser 44 cools the exhaust gas flow 40 to extract water that is gathered in a tank 56 and pressurized by a pump 58 for communication of the water flow 46 to the evaporator system 42. In one disclosed example, the fuel flow 50 is utilized as a heat sink to cool the exhaust gas flow 40 in the condenser 44. Other cold sink flows, such as a ram air flow through the bypass flow path B may be utilized to cool the exhaust gas flow 40 within the condenser 44 and are within the contemplation and scope of this disclosure.

Water recovered with the condenser 44 may also be provided as an intercooling water flow 54 to the compressor section 26. The water flow 54 is injected into a location within the compressor section 26 to cool the core flow and increase mass flow. The cooler and increased mass flow increase compressor operating efficiencies. The example water flow 54 is shown schematically and may be injected at any location within the compressor section 26 and upstream of the combustor 28.

The steam flow 48 from the evaporator 42 is communicated to the combustor 28 and combined with the exhaust gas flow 40 to increase mass flow through the turbine section 30 and thereby increase engine power and efficiency. The propulsion system 20 has an increased power output from the injected steam 48 due to an increasing mass flow through the turbine section 30 without a corresponding increase in work from the compressor section 26. Although the steam flow 48 is shown as being injected into the combustor 28, the steam flow 48 may be injected at other locations along the core flow path C.

The condenser 44 and the evaporator system 42 are heat exchangers that are exposed to the high temperatures of the exhaust gas flow 40. During typical engine operating conditions, the temperatures at each of the condenser 44 and the evaporator system 42 are within defined operating ranges. However, engine operating conditions at higher ambient temperatures or different operating settings may increase temperatures of the gas flow 40 and thereby the condenser 44 and evaporator system 42. Such higher temperature may approach predefined operating limits of the condenser 44 and the evaporator system 42. The example propulsion system 20 includes the aftercooler 70 for selectively injecting a cooling flow after the turbine section 30 to cool the gas flow 40. The aftercooler 70 includes nozzles 72 that inject water for evaporative cooling directly into the gas flow 40. In one example, the aftercooler 70 receives a cooling water flow 52 from the water tank 56.

A first temperature sensor 60 is disposed in the exhaust duct 38 upstream of the evaporator system 42. A second temperature sensor 62 is disposed to monitor a temperature upstream of the condenser 44 and downstream of the evaporator system 42. The temperature sensors 60, 62 measure temperatures T1, T2 associated with the evaporator system 42 and the condenser 44 and are configured to communicate information indicative of a temperature 66 within the exhaust duct 38 to a controller 64.

The controller 64 is provided and programmed to operate the aftercooler 70 by way of control signals 68 based on the information 66 from the temperature sensors 60, 62. The aftercooler 70 is operable by the controller 60 to selectively inject a cooling water mist into the exhaust duct based on sensed temperatures in at least one of the condenser 44 and the evaporator system 42 exceeding a predefined threshold temperature. In one example embodiment, the threshold temperature is determined based on the material and structural capability of the exhaust duct 38, the condenser 44 and/or the evaporator system 42. Moreover, other predefined engine operating conditions could be utilized to trigger injection of water flow to cool the gas flow 40.

Although the controller 60 is disclosed by way of example as programmed to operate the aftercooler 70 based on temperature information 66 other engine operating information, indicated schematically at 84 could be utilized to prompt operation of the aftercooler 70. The operating information 84 can include monitored engine parameters such as shaft speeds, pressures, and temperatures in other locations of the propulsion system 20. Moreover, the operation information 84 may include any other operational information gathered during engine operation, including, for example, ambient temperature and altitude.

The example controller 64 is further programmed to protect the structure and operation of the evaporator system 42. Water 46 is communicated to the evaporator 42 for the generation of the steam flow 48. Temperatures within the evaporator 42 are balanced between the high temperature gas flow 40 and the cooling water flow 46. Temperatures that exceed predetermined threshold values could reduce the life of the evaporator and therefore, the controller 66 is further programmed to adjust operation of the evaporator system 42 based, at least in part, on the temperature information 66.

The example controller 64 is a device and system for performing necessary computing or calculation operations. The example controller 64 may be specially constructed for this purpose, or it may comprise at least a general-purpose computer selectively activated or reconfigured by a computer program stored in the computer. The controller 64 may further be a dedicated controller, or may be a program stored on an engine or aircraft controller.

The controller 64 may include a computer program directing operation. Such a computer program and also data required for its execution may be stored in a computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Furthermore, the computer referred to may include a single processor or may be architectures employing multiple processor designs for increased computing capability.

In one operational embodiment, gas flow 40 through the evaporator system 42 generates steam flow 48 that is injected into the combustor 28. As heat in the gas flow 40 is used to generate steam, it cools and is communicated to the condenser 44. In the condenser 44, the gas flow is further cooled by rejecting heat to the cooling fuel flow 50. The gas flow 40 is cooled to the point where liquid water condenses and is routed to the water tank 56. The remaining gas flow is exhausted as indicated at 74.

During operation with the gas flow 40 within a predefined temperature range, the aftercooler 70 is not operated and gas flow 40 simply flows through to the evaporator system 42. However, when the temperature information 66 indicates that the gas flow 40 has exceeded a predefined threshold temperature, the coding water flow 52 is injected through nozzles 72. As the cooling water flow 52 evaporates, it cools the gas flow 40. A portion of the water flow 52 may be captured in the condenser 44 and returned to the water tank 56. Once the temperature fans below the temperature threshold, the aftercooler 70 is turned off and the cooling water flow 52 is stopped. The controller 64 may also take other steps to cool the gas flow 40 including adjusting engine operation if possible. Moreover, operation of the aftercooler 70 may coincide with other engine adjustments to maintain the temperature within desired operating ranges.

Figure 2:
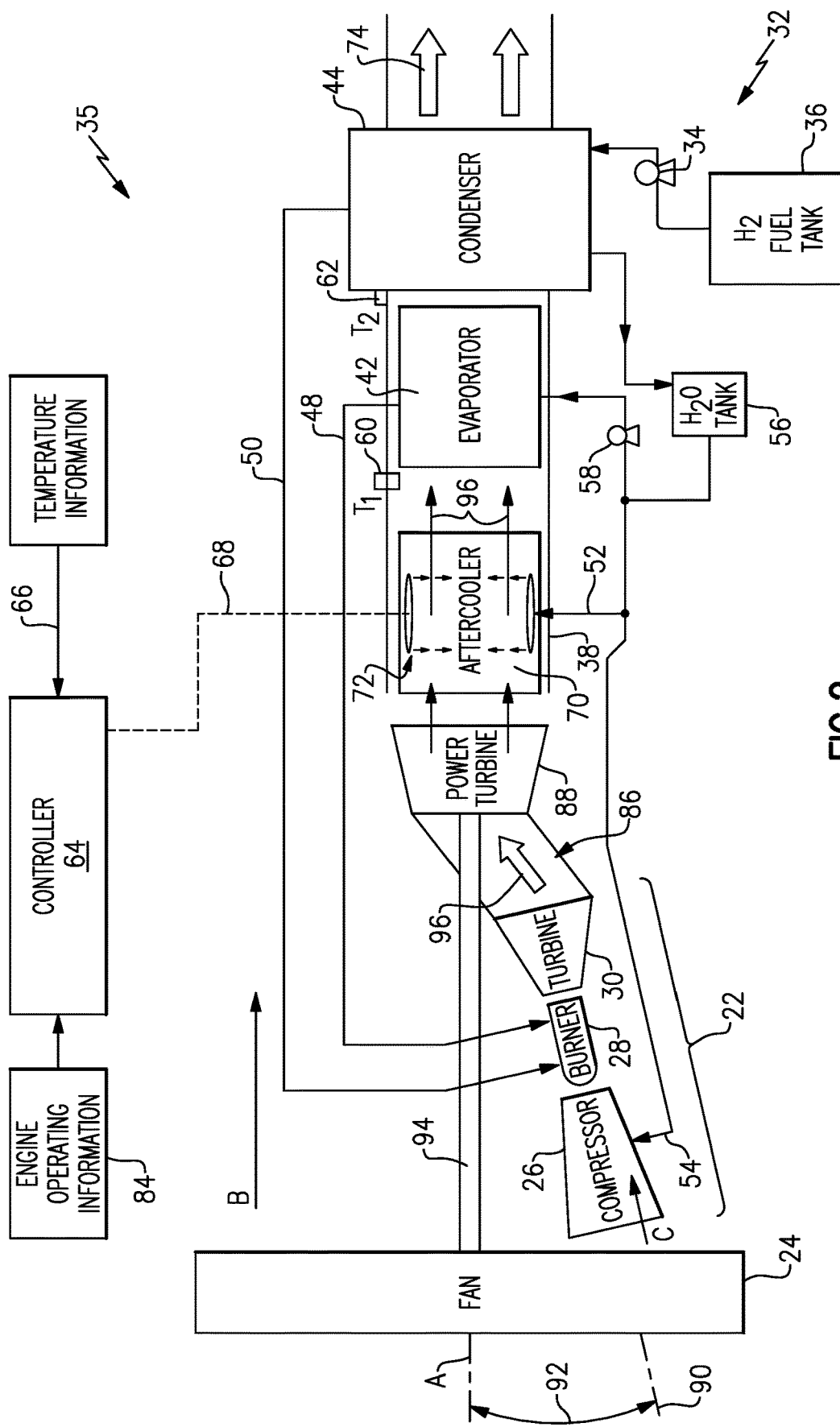
FIG. 2 is a schematic view of another example aircraft propulsion system embodiment.

Referring to FIG. 2, another example propulsion system 35 is schematically shown and includes an offset core engine 22. The core engine 22 is disposed along a core engine axis 90 that is offset at an angle 92 relative to the axis A. The example angle 92 is between around 25 degrees and 50 degrees however other angles could be utilized and are within the contemplation and scope of this disclosure. The relatively small size of the core engine 22 is enabled by the additional engine efficiency and power provided by steam injection. The small size of the core engine 24 enables the offset inclined orientation, as shown in the non-limiting illustrative example, toward the bottom center of the propulsion system 35. Although the example core engine 24 is orientated toward the bottom of the propulsion system 35, the core engine 24 may be located and orientated differently and remain within the contemplation and scope of this disclosure. An exhaust gas flow 96 generated in the core engine 22 is communicated through a duct 86 to a power turbine 88. The exhaust gas flow 96 expands through the power turbine 88 to drive the shaft 94 coupled to the fan 24.

The exhaust gas flow exiting the power turbine 88 is communicated through the aftercooler 70 and sequentially through the evaporator 42 and the condenser 44. Operation of the aftercooler 70, evaporator 42 and condenser 44 is the same as described above with regard to the engine embodiment 20 shown and described in FIG. 1. Although the aftercooler 70, evaporator 42 and condenser 44 are shown as being arranged along the engine axis A, other mounting locations may be utilized and are enabled by the offset orientation of the core engine 22.

Figure 3:
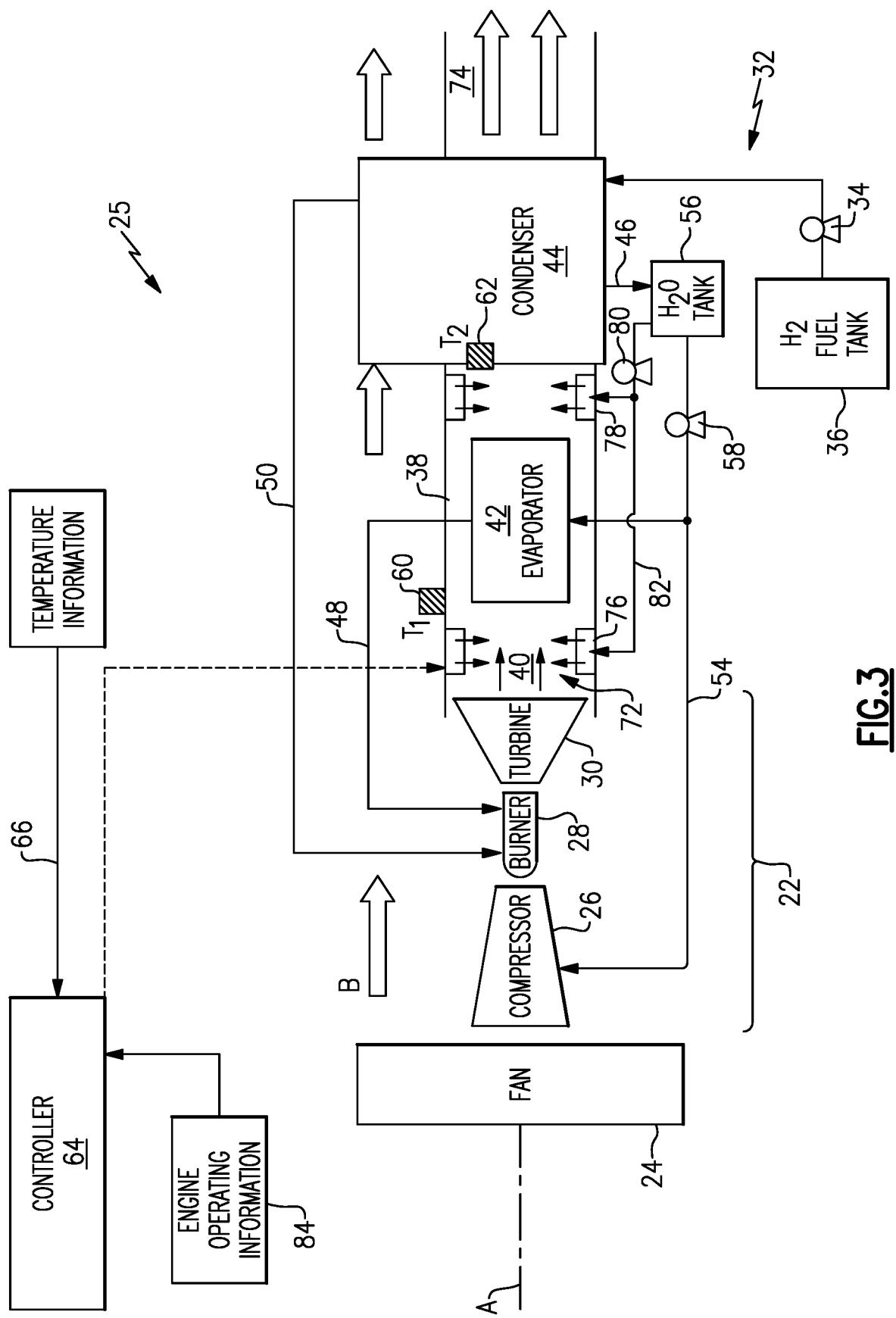
FIG. 3 is a schematic view of still another example aircraft propulsion system embodiment.

Referring to FIG. 3, another example propulsion system 25 is schematically shown and includes multiple locations for injection of a cooling flow into the gas flow 40. In one example embodiment, a first aftercooler 76 is located to inject a cooling flow into the gas flow 40 between the turbine section 30 and the evaporator system 42 and a second aftercooler 78 is located for injecting a cooling flow between the evaporator system 42 and the condenser 44. Each of the first aftercooler 76 and the second aftercooler 78 are operated by the controller 64 to selectively inject cooling water flow 82 based on exceeding of predefined threshold values. In one example embodiment, the threshold value is the temperature measured by the temperature sensors 60, 62. Other operating values could be utilized that are indicative of temperatures or other engine operating conditions that may warrant injection of the water flow 82 to cool the gas flow 40.

In this example embodiment, a pump 80 is utilized to pressurize the cooling water flow 82 separate from the pump 58. The separate pump 80 enables different pressures to be utilized for the cooling flow 82 and the flow of water to the evaporator system 42 for the generation of the steam flow 48.

Moreover, the first aftercooler 76 and the second aftercooler 78 may be operated individually based on separate predefined temperature threshold values. In one example, the evaporator system 42 and the condenser 44 have different temperature thresholds the prompt actuation of one or both of the first and second aftercoolers 76, 78. The controller 64 may selectively operate each of the first aftercooler 76 and the second aftercooler 78, individually or cumulatively to cool the gas flow to acceptable operating ranges.

Accordingly, the example engine embodiments provide protection of the evaporator and condenser from non-typical operating temperatures of the exhaust gas flow by injection of cooling water from an aftercooler into the exhaust duct.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
a compressor section where an inlet airflow is compressed;
a combustor section where the compressed inlet airflow is mixed with fuel and ignited to generate an exhaust gas flow that is communicated through a core flow path;
a turbine section through which the exhaust gas flow expands to generate a mechanical power output;
a condenser at least partially disposed within the core flow path where water is extracted from the exhaust gas flow;
an evaporator system at least partially disposed within the core flow path upstream of the condenser where thermal energy from the exhaust gas flow is utilized to generate a steam flow from at least a portion of water extracted by the condenser for injection into a core flow path; and
an aftercooler where a cooling flow is selectively injected into the core flow path downstream of the turbine section and upstream of at least the condenser for cooling the exhaust gas flow in response to a parameter indicative of an engine operating parameter exceeding a predefined condition.

2. The turbine engine assembly as recited in claim 1, wherein the aftercooler is configured to inject the cooling flow into the core flow path downstream of the turbine section and upstream of the evaporator.

3. The turbine engine assembly as recited in claim 1, including a controller configured to operate the aftercooler, wherein the controller is further configured to receive information indicative of the engine operating parameter and to actuate the aftercooler to inject the cooling flow into the core flow path responsive to a determination that the predefined condition has been exceeded.

4. The turbine engine assembly as recited in claim 1, wherein the cooling flow comprises a flow of liquid water.

5. The turbine engine assembly as recited in claim 4, further including a water pump pressurizing the flow of liquid water to a pressure equal to or greater than a pressure of the gas flow within the core flow path.

6. The turbine engine assembly as recited in claim 4, wherein at least a portion of the flow of liquid water is extracted by the condenser from the exhaust gas flow through the core flow path.

7. The turbine engine assembly as recited in claim 1, wherein the engine operating parameter comprises a temperature of a duct corresponding to one of the evaporator system or the condenser.

8. The turbine engine assembly as recited in claim 3, including at least one sensor for measuring a temperature associated with at least one of the condenser or the evaporator system and configured to communicate a measured temperature to the controller.

9. The turbine engine assembly as recited in claim 3, wherein the condenser and the evaporator system are at least partially disposed within an exhaust duct and the controller is further programmed to operate the aftercooler to cool the exhaust duct.

10. An aircraft propulsion system comprising:
a compressor section where an inlet airflow is compressed;
a combustor section where the compressed inlet airflow is mixed with fuel and ignited to generate an exhaust gas flow that is communicated through a core flow path;
a turbine section through which the exhaust gas flow expands to generate a mechanical power output;
an exhaust duct defining the core flow path for the exhaust gas flow exiting the turbine section;
a condenser at least partially disposed within the exhaust duct, the condenser configured for extracting water from the exhaust gas flow;
an evaporator system at least partially disposed within the exhaust duct upstream of the condenser, the evaporator system being configured to use thermal energy from the exhaust gas flow to vaporize water into a steam flow from at least a portion of water extracted by the condenser for injection into a core flow path;

an aftercooler configured to selectively inject a cooling water flow into the core flow path downstream of the turbine section for cooling the exhaust gas flow; and a controller configured to actuate the aftercooler in response to an indication that a temperature associated with the condenser or the evaporator system has exceeded a predefined threshold.

11. The aircraft propulsion system as recited in claim 10, wherein at least the compressor section, combustor section and the turbine section are arranged along a core engine axis that is offset relative to an engine longitudinal axis.

12. The aircraft propulsion system as recited in claim 10, wherein the aftercooler is configured to inject the cooling water flow into the exhaust duct upstream of the evaporator system.

13. The aircraft propulsion system as recited in claim 10, wherein at least a portion of the cooling water flow is extracted from the exhaust gas flow by the condenser.

14. The aircraft propulsion system as recited in claim 10, wherein the aftercooler includes a plurality of injectors for communicating the cooling water flow into the exhaust duct.

15. The aircraft propulsion system as recited in claim 10, wherein the aftercooler includes a first portion for injecting cooling water flow toward the evaporator system and a second portion for injecting cooling water flow toward the condenser.

16. The aircraft propulsion system as recited in claim 10, including at least one sensor for measuring a temperature associated with at least one of the condenser or the evaporator system and configured to communicate a measured temperature to the controller.

17. A method of operating a gas turbine engine, the method comprising:

generating an exhaust gas flow that is communicated through a core flow path;

expanding the gas flow through a turbine section to generate a mechanical power output;

routing the exhaust gas flow through an exhaust duct defining the core flow path for the exhaust gas flow exiting the turbine section;

extracting water from the gas flow in a condenser that is at least partially disposed within the exhaust duct;

generating a steam flow by heating water extracted by the condenser with an evaporator at least partially disposed within the exhaust duct;

monitoring a temperature within the exhaust duct at a location downstream of the turbine section; and injecting a cooling water flow into the exhaust duct in response to a measured temperature within the exhaust duct exceeding a predefined threshold temperature to reduce a temperature of the exhaust gas flow to a temperature compatible with operation of the condenser or the evaporator.

18. The method as recited in claim 17, further comprising pressurizing water extracted from the exhaust gas flow and utilizing the pressurized water for injection into the exhaust duct.

19. The method as recited in claim 17, further comprising selectively injecting water at a location upstream of the evaporator.

20. The method as recited in claim 17, further comprising selectively injecting water at a location downstream of the evaporator.

* * * * *